United States Patent [19]

Tanamachi et al.

[11] Patent Number: 4,723,201

[45] Date of Patent: Feb. 2, 1988

[54] CONTROL APPARATUS FOR PULSE WIDTH MODULATION INVERTERS

[75] Inventors: Tokunosuke Tanamachi; Kiyoshi Nakamura, both of Katsuta, Japan

[73] Assignee: Hitachi, Ltd., Japan

[21] Appl. No.: 3,024

[22] Filed: Jan. 13, 1987

[30] Foreign Application Priority Data

Jan. 13, 1986 [JP] Japan .................. 61-3441

[51] Int. Cl.⁴ .......................................... H02M 7/527
[52] U.S. Cl. ....................................... 363/41; 363/95; 363/135; 318/811
[58] Field of Search ................... 363/40, 41, 95, 96, 363/135; 318/805–812

[56] References Cited

U.S. PATENT DOCUMENTS 3,819,992  6/1974  Opal et al. .................. 363/41 X
4,615,000  9/1986  Fujii et al. .................. 363/41
4,636,928  1/1987  Deguchi et al. .............. 363/41

Primary Examiner—Patrick R. Salce
Assistant Examiner—Emanuel Todd Voeltz
Attorney, Agent, or Firm—Antonelli, Terry & Wands

[57] ABSTRACT

In a PWM inverter, a first three pulse mode, in which three voltage pulses exist within 120° in the electric angle of the inverter output voltage, is changed over to a single pulse mode, in which the pulse width is equal to 120°, through a second three pulse mode, which is composed of two voltage pulses on both sides outside the period of 120° and a center voltage pulse therebetween.

The jump of the output voltage and the phase deviation therein upon changeover between the three pulse mode and the single pulse mode is prevented by controlling the pulse width of the two side pulses and the intervals between the center pulse and the side pulses.

11 Claims, 48 Drawing Figures

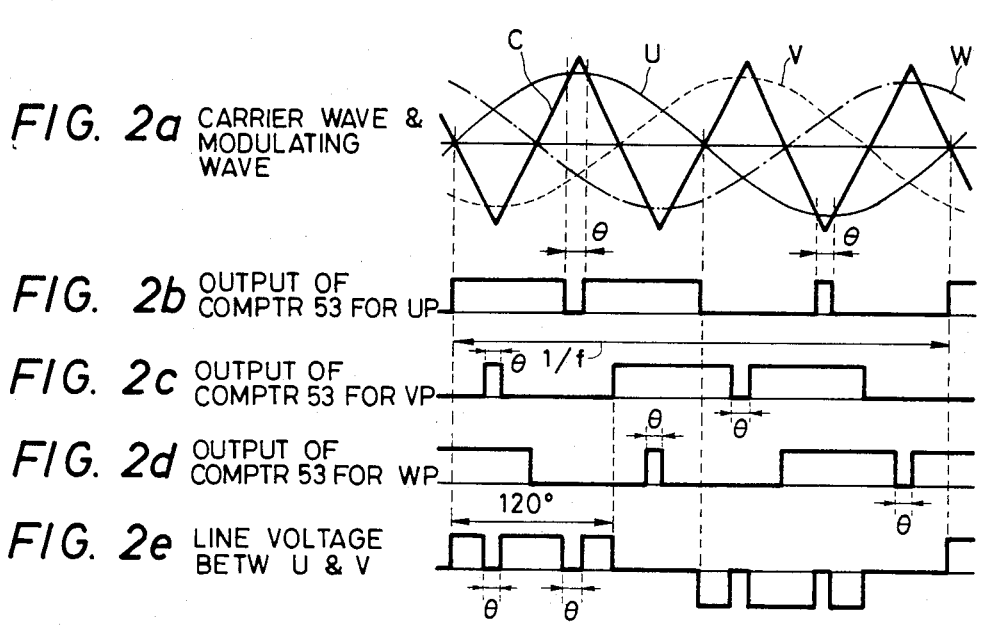
FIG. 2a CARRIER WAVE & MODULATING WAVE
FIG. 2b OUTPUT OF COMPTR 53 FOR UP
FIG. 2c OUTPUT OF COMPTR 53 FOR VP
FIG. 2d OUTPUT OF COMPTR 53 FOR WP
FIG. 2e LINE VOLTAGE BETW U & V
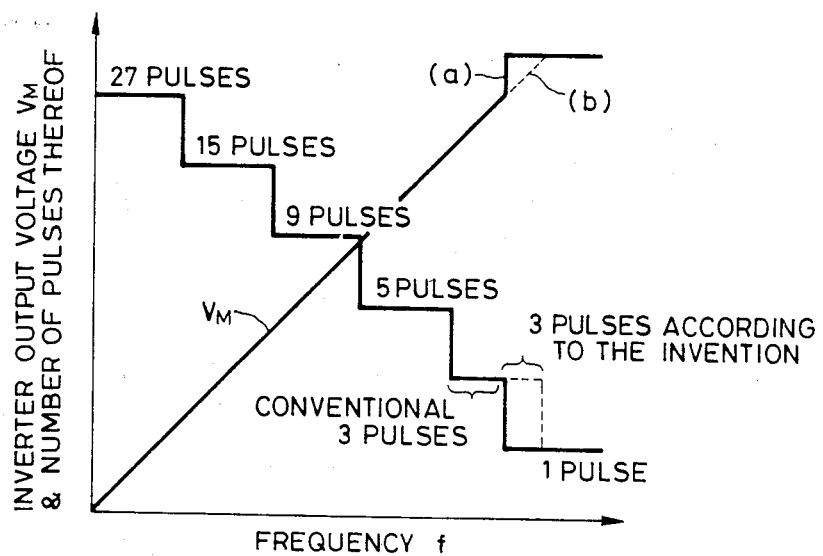
FIG. 3

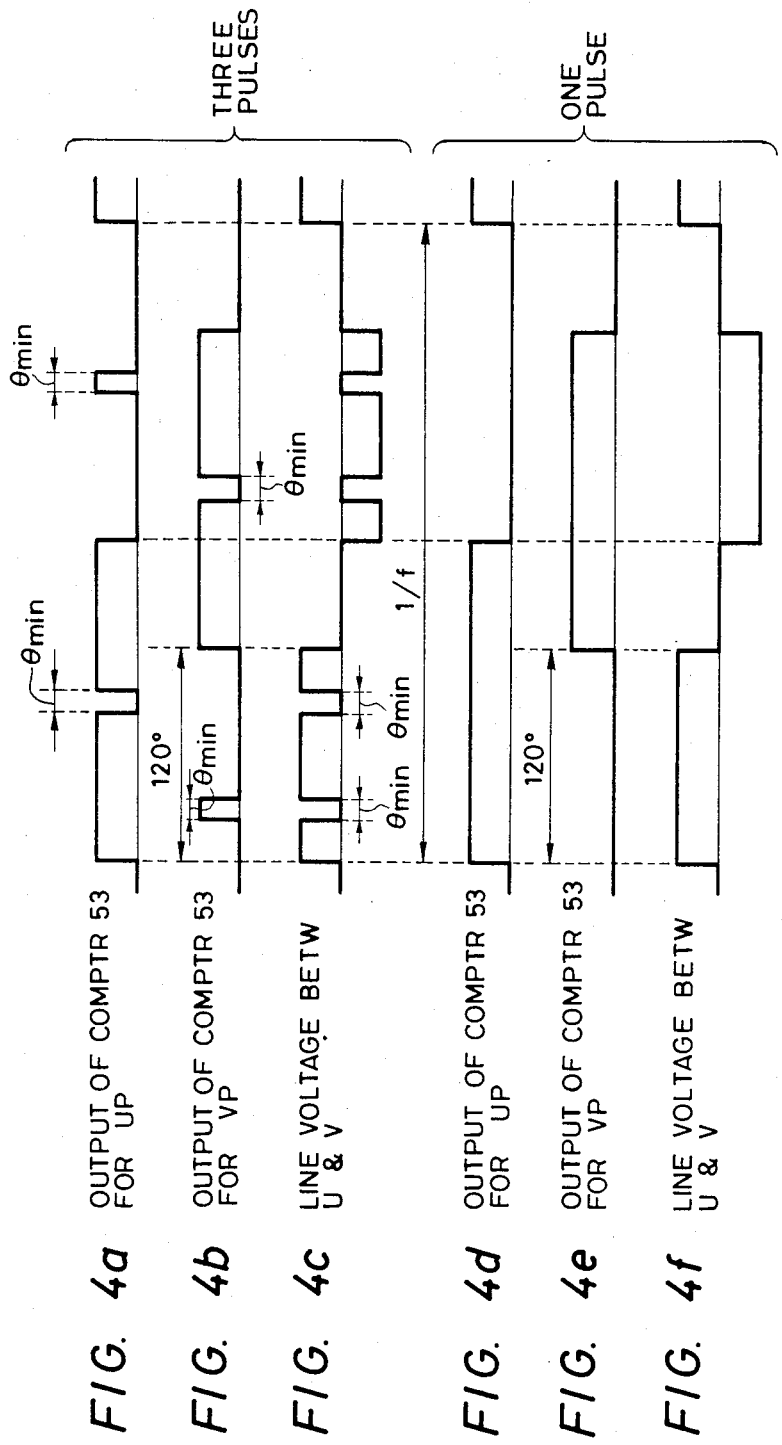

FIG. 5a CARRIER WAVE & MODULATING WAVE FOR U PHASE
FIG. 5b OUTPUT OF COMPTR 53 FOR UP
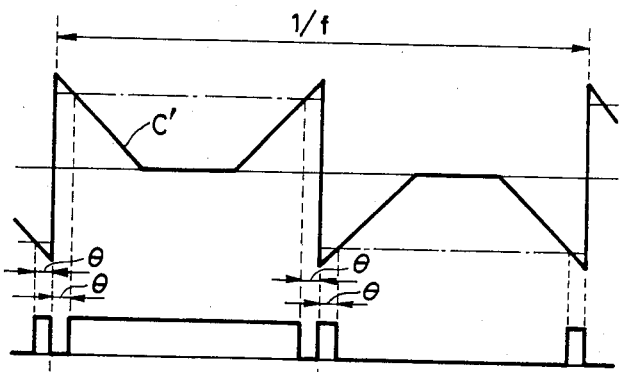
FIG. 5c CARRIER WAVE & MODULATING WAVE FOR V PHASE
FIG. 5d OUTPUT OF COMPTR 53 FOR VP
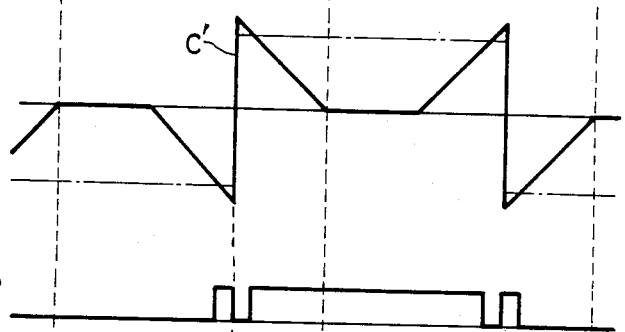
FIG. 5e CARRIER WAVE & MODULATING WAVE FOR W PHASE
FIG. 5f OUTPUT OF COMPTR 53 FOR WP
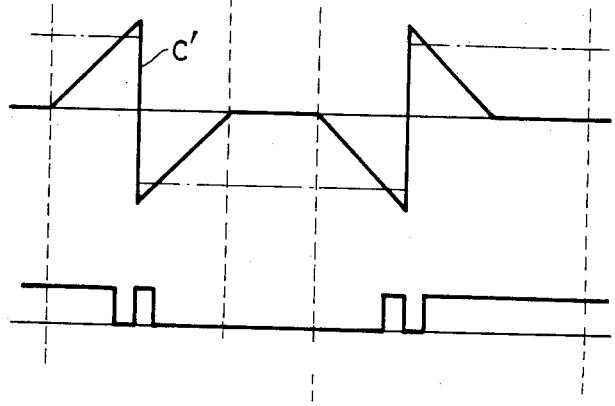
FIG. 5g LINE VOLTAGE BETW U & V
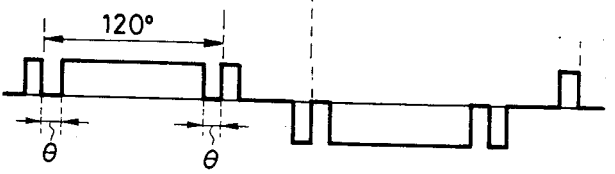

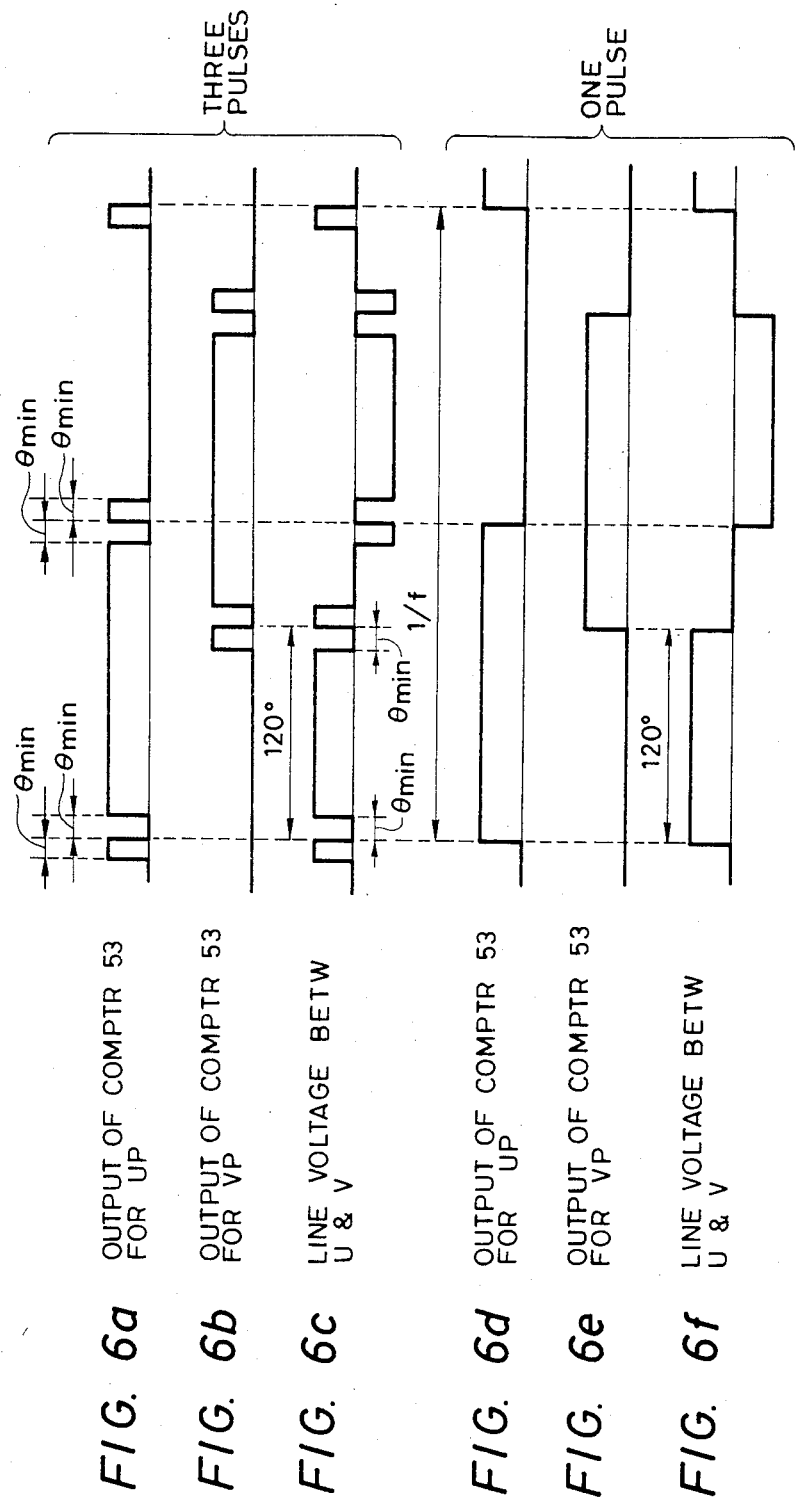

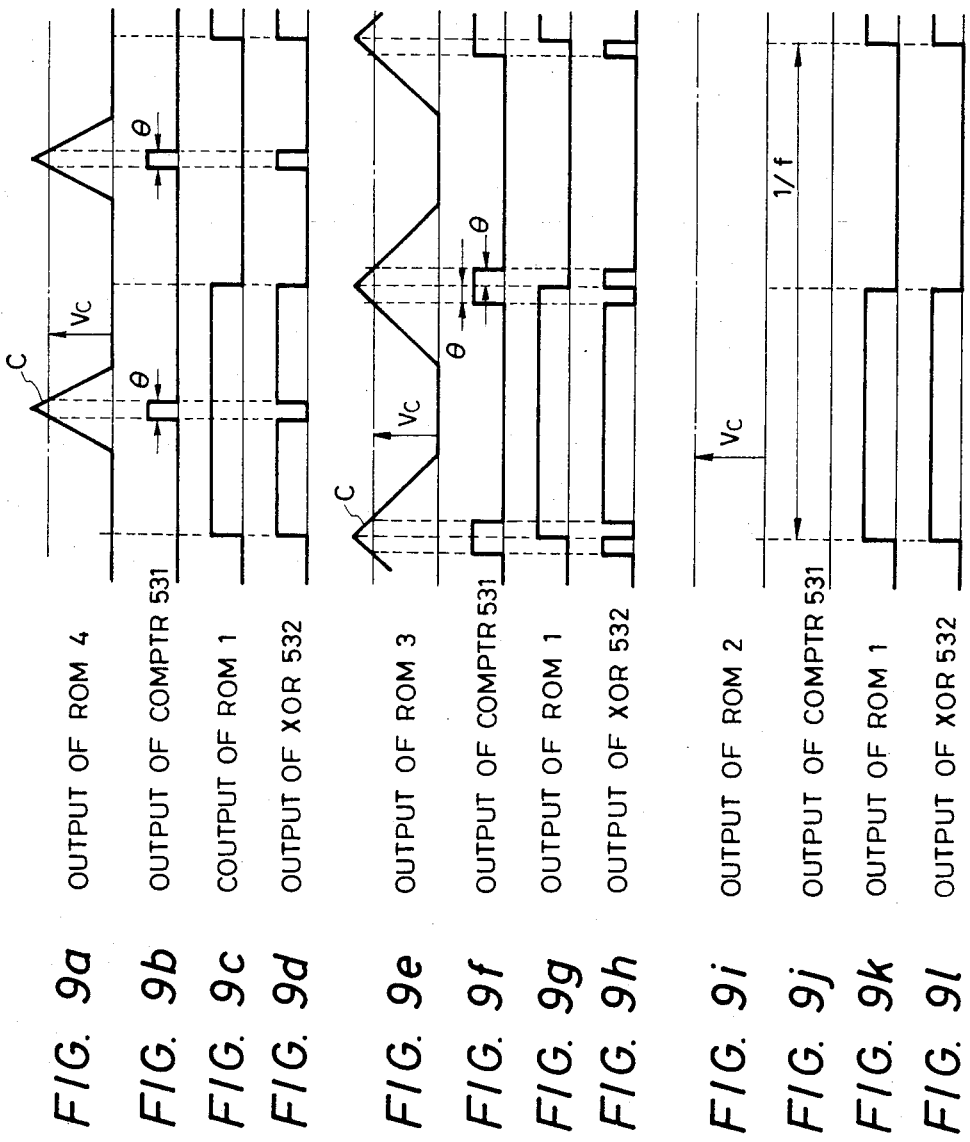

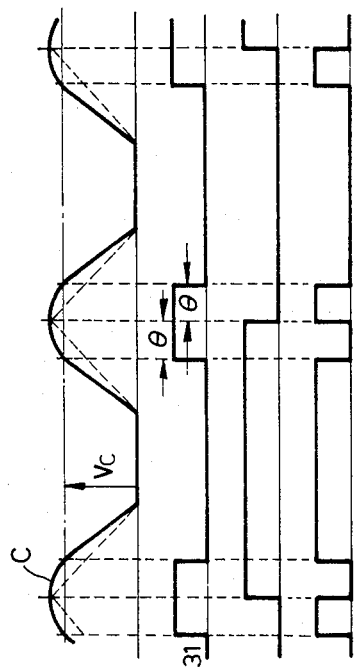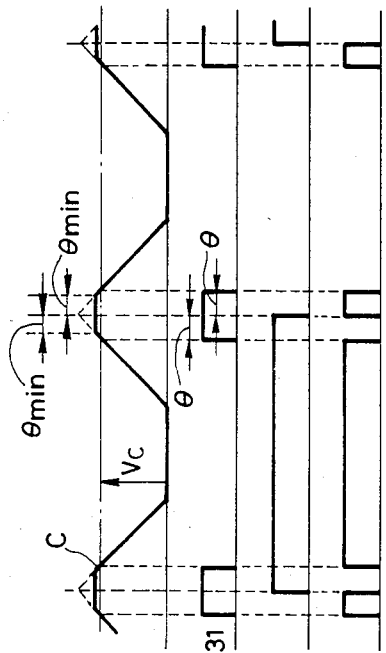

CONTROL APPARATUS FOR PULSE WIDTH MODULATION INVERTERS

BACKGROUND OF THE INVENTION

1. Field of the Invention

The present invention relates to a control apparatus for a pulse width modulation inverter, and more particularly to a control apparatus having an improved changeover function between a three pulse mode and a single pulse mode of an inverter output voltage.

2. Description of the Related Art

Although the details will be described later, in a pulse width modulation inverter (called a PWM inverter, hereinafter), the number of voltage pulses in the half cycle of the operation period of the PWM inverter is varied during the control of the output AC voltage thereof. When it becomes necessary to increase the inverter output voltage, at the last course of control, the number of the output voltage pulses in the half cycle of the operation period of the inverter must be changed over from three pulses to one pulse in order to obtain the highest output voltage possible, that is, the operation of the inverter has to be switched from a three pulse mode to a single pulse mode.

One of the control technique for the PWM inverter of this kind is disclosed in the Japanese Patent Laid-open No. 57-132772, for example. According thereto, a control system is intended to solve the following problems in an adjustable voltage/adjustable frequency PWM inverter, i.e., the undesirable change in the inverter output voltage upon changeover between a three pulse mode and a single pulse mode, and the phase deviation of the fundamental component of the inverter output voltage at that time. This control system, however, is not yet devoid of problems that the control is complicated and the phase of the fundamental component of the inverter output voltage still changes during the course of the phase control which is conducted with three pulses for the changeover from the three pulse mode to the single pulse mode and vice versa.

In Japanese Patent Laid-open No. 57-85583, there is disclosed a control method of obtaining gate signals of a PWM inverter by comparison of a triangular wave as a carrier wave and two sinusoidal waves as modulating waves which have the phase difference of 120° from each other. Also in this method, however, the phase deviation occurs in the fundamental component of the inverter output voltage at the time of changeover between a three pulse mode and a single pulse mode. Further, in this method, it is very difficult due to the inductance of a motor supplied by the inverter that the inverter output voltage in the single pulse mode is determined in advance to be almost equal to the maximal inverter output voltage in the three pulse mode, and therefore the undesirable change in the inverter output voltage can not be suppressed.

On the other hand, the Japanese Patent Publication No. 60-24670 discloses a method of generating a multipulse current in every half cycle of the fundamental component of the output current in a current source inverter. However, this prior art only concerns the reduction of higher harmonic components included in the output current and does not disclose that the number of current pulses is changed over for controlling the output current of the inverter. Therefore, although the waveform of gate signals similar to those according to the present invention is shown, there is nowhere in the prior art the description of the change in the output voltage or current and the phase deviation which occur at the time of changeover between a three pulse mode and a single pulse mode of the output voltage or current of an PWM inverter.

SUMMARY OF THE INVENTION

It is therefore an object of the present invention to provide a control apparatus for a PWM inverter which reduces the change quantity of an inverter output voltage at the time of changeover between a three pulse mode and a single pulse mode and does not cause, either, the phase deviation of the fundamental component of the inverter output voltage.

A feature of the present invention is in that, in a PWM inverter, in which the number of pulses of a line voltage (called line voltage pulses, hereinafter) for every half cycle of an output AC voltage of the inverter is changed over in accordance with the frequency of the output AC voltage and the intervals between the line voltage pulses are controlled in every mode of the respective numbers of the line voltage pulses, a first three pulse mode, in which three line voltage pulses exist within 120° in the electric angle of the output AC voltage, is changed over to a single pulse mode, in which the width of the line voltage pulse is equal to 120° in the same electric angle, through a second three pulse mode, which is composed of two line voltage pulses positioned on both sides outside the period of 120° in the same electric angle and a center line voltage pulse positioned between the two line voltage pulses.

According to the present invention, the maximal output AC voltage in the second three pulse mode can be made substantially equal to that in the single pulse mode by suitably controlling the pulse width of the two line voltage pulses on both sides and the intervals between the center line voltage pulse and the two line voltage pulses, so that the jump of the output AC voltage and the phase deviation in the output AC voltage, which have occurred in the conventional apparatus upon changeover between the three pulse mode and the single pulse mode, can be prevented.

BRIEF DESCRIPTION OF THE DRAWINGS

FIGS. 2a to 2e are drawings for explaining the generation of gate signals for the inverter and the waveform of a line voltage of an output AC voltage of the inverter in a first three pulse mode;

FIG. 3 is a diagram showing the relation of the number of line voltage pulses and the output AC voltage with respect to the frequency of the output AC voltage;

FIGS. 4a to 4f show the relation between the gate signals and the line voltage in the first three pulse mode when the intervals between the line voltage pulses are minimal, and that in the single pulse mode;

FIGS 5a to 5g are drawings for explaining the generation of gate signals for the inverter and the waveform of the line voltage of the output AC voltage in a second three pulse mode;

FIGS. 6a to 6f show the relation between the gate signals and the line voltage in the second three pulse mode when the intervals between the line voltage pulses are minimal, and that in the single pulse mode;

FIGS. 9a to 9l are drawings for explaining the generation of gate signals for the inverter by the modulation means shown in FIG. 8;

FIGS. 10a to 10d are drawings for explaining a modification of the generation of the gate signals for the inverter; and FIGS. 11a to 11d are drawings for explaining another modification of the generation of the gate signals for the inverter.

DESCRIPTION OF THE PREFERRED EMBODIMENT

Figure 1:
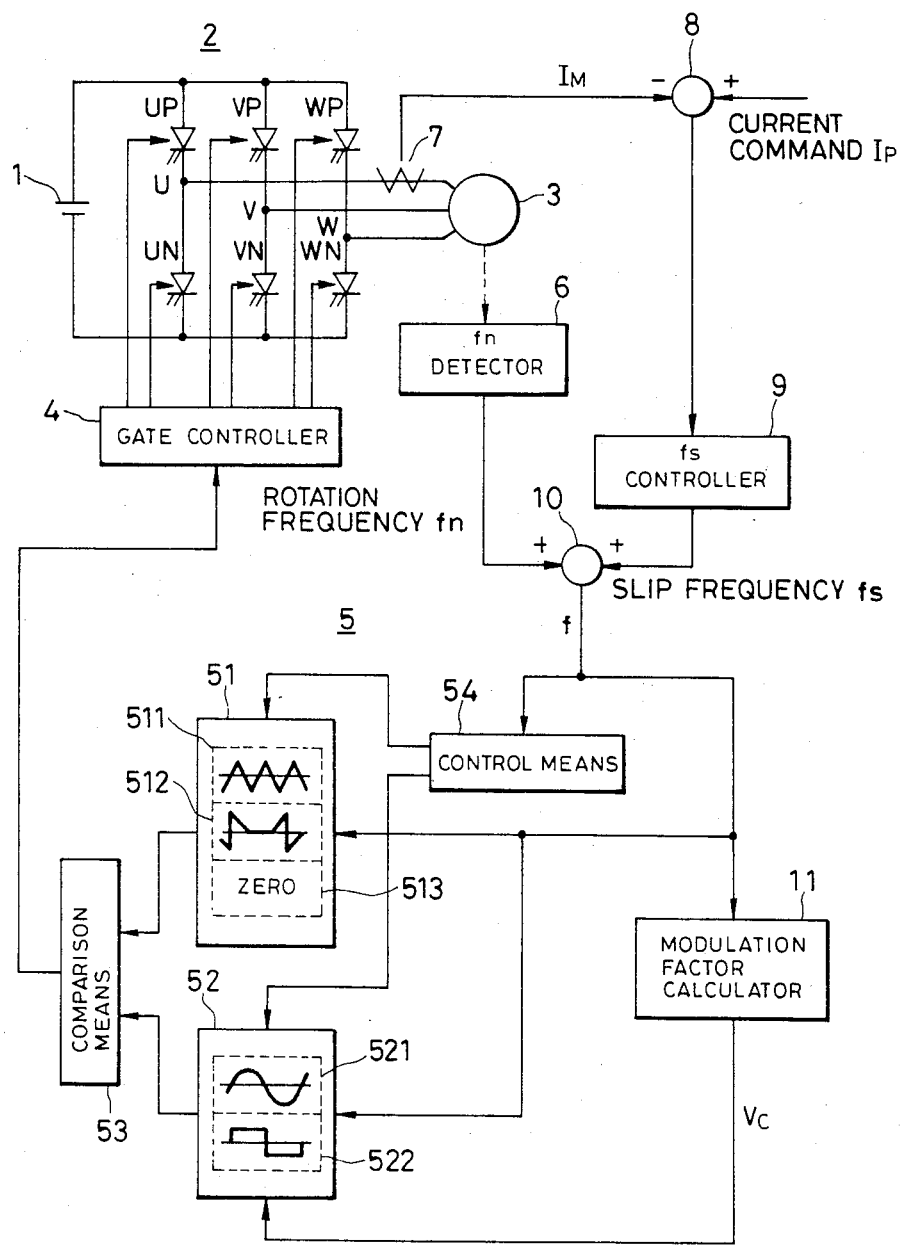
FIG. 1 is a block diagram showing the general construction of a control apparatus for a PWM inverter according to an embodiment of the present invention, which is applied to the control of an induction motor.

FIG. 1 is a schematic diagram showing a general construction of a control apparatus for a PWM inverter, applied to an induction motor control, in accordance with an embodiment of the present invention. Reference numeral 1 represents a DC power source, 2 a pulse width modulation inverter consisting of control switching devices UP, VP, WP and UN, VN, WN such as thyristors, 3 an induction motor and 5 a modulation circuit consisting of carrier wave generation means 51, modulation wave generation means 52, comparison means 53 and control means 54. The control switching devices UP to WN of the inverter 2 are turned on or off in a predetermined sequence by the output of this modulation circuit 5 through a gate controller 4.

In FIG. 1, the rotation frequency $f_n$ of the induction motor 3 is detected by an $f_n$ detector 6, and a slip frequency $f_s$ is added to, and subtracted from, the rotation frequency $f_n$ by an adder 10 during power running and regenerative running, respectively. This becomes an output frequency $f$ ($=f_n \pm f_s$) of the inverter 2. The slip frequency $f_s$ is controlled by an $f_s$ controller 9 by detecting a value $I_M$ of the current of the induction motor 3 by a current detector 7 and comparing the detected value $I_M$ with a current command $I_P$ in a comparator 8.

On the other hand, the modulation circuit 5 receives the output of the adder 10. A first carrier wave generator 511 of the carrier wave generation means 51 generates an alternating triangular wave C as shown in FIG. 2a, and a sinusoidal modulation wave generator 521 of the modulation wave generation means 52 generates sinusoidal modulating waves for U, V and W phases as shown by U, V and W in FIG. 2a. The comparison means 53 compares the sinusoidal modulating waves U, V and W with the triangular carrier wave C and generates gate pulses for the control switching devices UP, VP and WP, as shown in FIGS. 2b to 2d. Pulses (not shown) obtained by inversing the pulses shown in these figures are made gate pulses for the control switching devices UN, VN and WN. Although the detailed explanation is omitted here, the line voltage between two phases of the inverter output voltage has the waveform obtained by the exclusive-OR of the gate pulses of the corresponding phases. Therefore, the line voltage between phases U and V of the inverter 2 exhibits the waveform shown in FIG. 2e.

In FIG. 2, there is shown an example, in which three pulses exist in the half cycle of the output voltage of the inverter 2. This mode is conventional and called a first three pulse mode hereinafter. The number of pulses of the output voltage of the inverter 2 contained in every half cycle thereof is controlled by changing the ratio of the frequency of the triangular carrier wave C to that of the sinusoidal modulating waves U, V and W; usually the frequency of the carrier wave is changed, and that of the modulating wave is maintained constant. This pulse number is changed in the order of 27, 15, 9, 5 and 3 pulses, for example, as shown in FIG. 3, by the control means 54 with respect to the output frequency $f$ of the inverter 2.

The output voltage $V_M$ of the inverter 2 is controlled by varying the width $\theta$ of a slit in the gate pulses as shown in FIGS. 2b to 2d and therefore in the line voltage as shown in FIG. 2e. It will be understood from the figures that the width $\theta$ of the slit can be controlled by varying the modulation factor $V_C$, i.e., the ratio of the peak value of the sinusoidal modulating waves U, V and W to that of the triangular carrier wave C, by a modulation factor calculator 11, in such a manner that the output voltage $V_M$ becomes continuous with respect to the output frequency $f$ of the inverter 2, as shown in FIG. 3. Usually, the peak value of the modulating wave is changed in order to control the width $\theta$ of the slit, and that of the carrier wave is kept constant.

By the way, in order to increase the output voltage $V_M$ of the inverter 2 up to the highest voltage that the inverter 2 can output, the three pulse mode of the output voltage $V_M$ must be changed over to the single pulse mode, because the width $\theta$ of the slit is limited to the minimum extinction period $\theta_{min}$ necessary for the control switching devices UP to WN to turn off. This state is shown in FIGS. 4a to 4f.

Thereamong, FIGS. 4a, 4b, 4d and 4e illustrate the outputs of the comparison means 53, on the basis of which gate pulses of the corresponding control switching devices UP and VP are generated by the gate controller 4. Therefore, the pulses shown in these figures can be considered as the gate pulses of the respective control switching devices UP and VP, during the high level of which the corresponding control switching devices UP and VP continue to be conductive.

As already described with reference to FIG. 2, gate pulses (not shown) for the control switching devices UN and VN are obtained by inversing the pulses shown in these figures. As the result of applying such gate pulses to the corresponding control switching devices UP to VN, the line voltage between phases U and V become as shown in FIGS. 4c and 4f.

When the width $\theta$ of the slit in the gate pulse becomes $\theta_{min}$ as shown in FIGS. 4a and 4b, namely when the output voltage $V_M$ of the inverter 2 becomes as shown in FIG. 4c, the three pulse mode of the output voltage $V_M$ is changed over to the single pulse mode thereof as shown in FIG. 4f, in order to further increase the output voltage $V_M$ of the inverter 2. For this purpose, the gate pulses are changed over, too, from those as shown in FIGS. 4a and 4b to those as shown in FIGS. 4d and 4e. However, if the operational mode of the inverter 2 is changed over from the three pulse mode to the single pulse mode, the output voltage $V_M$ varies abruptly as represented by (a) in FIG. 3 (the quantity of this voltage variation will be described later).

Then, by the control means 54, the first carrier wave generator 511 in the carrier wave generation means 51 is changed over to a second carrier wave generator 512 and the sinusoidal modulating wave generator 521 in the modulation wave generation means 52 to a rectangular modulating wave generator 522, at the output frequency f of the inverter 2 at which the width θ becomes equal to $\theta_{min}$.

The second carrier wave generator 512 generates a modified carrier waves C' as shown by solid lines in FIGS. 5a, 5c and 5e. As apparent from these figures, the modified carrier wave C' is composed of two triangular waves for every half cycle of and in synchronism with a rectangular modulating wave shown by chain lines in the figures, which will be described in detail later. Each of the triangular waves has the positive or negative peak value at the zero cross point of the rectangular modulating wave of the corresponding phase. The interval between the peak value points of two triangular waves are 180° in the electrical angle, and the bottom value points thereof are 60° apart from each other. These rectangular modulating waves are generated by the rectangular modulating wave generator 522 in the modulation wave generation means 52.

The comparison means 53 compares the rectangular modulating waves with the corresponding modified carrier waves and generates gate pulses for the control switching devices UP, VP and WP as represented in FIGS. 5b, 5d and 5f. Inversed pulses (not shown) of the pulses of FIGS. 5b, 5d and 5f become gate pulses for the control switching devices UN, VN and WN.

As the result of applying such gate pulses as mentioned above, the waveform of the line voltage, for example, between phases U and V of the output voltage $V_M$ becomes three pulses consisting one pulse positioned at the center of the width 120° and two pulses positioned on both external sides of the width 120°, as shown in FIG. 5g. As apparent from the relationship indicated in FIG. 5g, the center pulse has the pulse width of 120°−2θ and each side pulse has the pulse width of θ. The three pulse mode of the inverter output voltage, as shown in FIG. 5g, is called a second three pulse mode, hereinafter.

In this second three pulse mode, the output voltage $V_M$ of the inverter 2 is increased by decreasing the width θ of the slit in the gate pulses, that is, by increasing the magnitude of the rectangular modulating waves by means of the output $V_C$ of the modulation factor calculator 11 so that, as shown by a dotted line (b) in FIG. 3, the further continuous increase in the output voltage $V_M$ is attained with respect to the output frequency f of the inverter 2.

When the width θ reaches $\theta_{min}$, as shown in FIGS. 6a to 6c, the output voltage $V_M$ of the inverter 2 becomes the largest value in the second three pulse mode. In order to increase the output voltage $V_M$ of the inverter 2 to the maximum voltage that the inverter 2 can output, the second carrier wave generator 512 is switched over to a third carrier wave generator 513 by the control means 54 at the output frequency of the inverter 2 at which the width θ becomes equal to $\theta_{min}$.

The third carrier wave generator 513 generates an output of the zero level, and the comparison means 53 compares the output with the rectangular modulating waves shown in FIGS. 5a, 5c and 5e generated by the rectangular modulating wave generator 522 to output gate pulses for the control switching devices UP and WN. Thereamong, the gate pulses for the control switching devices UP and VP are shown in FIGS. 6d and 6e. As a result, the line voltage between phases U and V becomes one pulse having the pulse width of 120°, as shown in FIG. 6f.

When the changeover from the second three pulse mode of FIG. 6c to the single pulse mode of FIG. 6f is compared with the changeover from the first three pulse mode of FIG. 4c to the single pulse mode of FIG. 4f, which is the same as that of FIG. 6f, the line voltage between phases U and V in the second three pulse mode of FIG. 6c, which corresponds to the total area of the three pulses shown in the figure, is substantially equal to that in the single pulse mode of FIG. 6f, whereas the line voltage between phases U and V in the first three pulse mode of FIG. 4c, which corresponds to the total area of the three pulses in the figure, is considerably smaller than that in the single pulse mode shown in FIG. 4f.

It can be therefore understood that the changeover from the second three pulse mode to the single pulse mode shown in FIG. 6 exhibits the smaller quantity of change in the output voltage $V_M$ of the inverter 2 and the smaller phase deviation of the fundamental frequency component of the output voltage $V_M$ of the inverter 2 than the changeover of mode shown in FIG. 4.

In the following, the quantity of change in the output voltage $V_M$ of the inverter 2 at the time of the changeover from the three pulse mode to the one pulse mode will be discussed.

If the output voltage waveform of the inverter 2 during the second three pulse mode of FIG. 5g is developed into the Fourier series, the magnitude (effective value) $V_{N3}$ of its fundamental component is given as follows:

$$V_{N3} = \frac{4E_s}{\sqrt{2}\,\pi}(\cos(30° - \theta) - \cos 30° + \cos(30° + \theta)) \quad (1)$$

Similarly, the fundamental component (effective value) $V_{03}$ of the output voltage waveform of the inverter 2 during the first three pulse mode of FIG. 2e is given as follows:

$$V_{03} = \frac{4E_s}{\sqrt{2}\,\pi}\left(\cos 30° - \cos\left(60° - \frac{\theta}{2}\right) + \cos\left(60° + \frac{\theta}{2}\right)\right) \quad (2)$$

$E_s$ in formulas (1) and (2) represents the voltage value of the DC power source 1.

Figure 7:
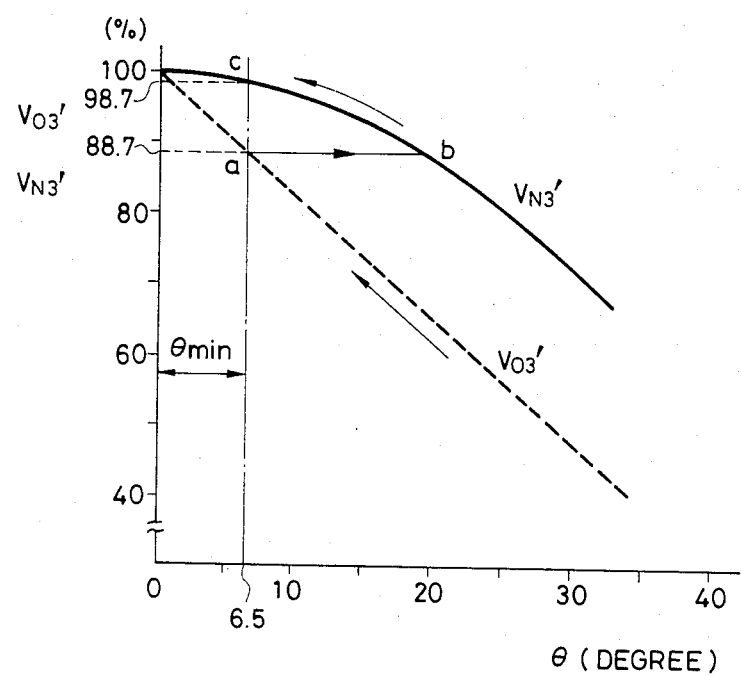
FIG. 7 shows the characteristics of the inverter output voltage with respect to the interval between the line voltage pulses in the first and the second three pulse modes.

In accordance with formulas (1) and (2), the values $V_{N3}$ and $V_{03}$ with respect to the width θ are normalized by those of the single pulse mode, that is, by the value at the time of θ=0°, and the resulting values $V'_{N3}$ and $V'_{03}$ are plotted on a diagram shown in FIG. 7. As can be understood from FIG. 7, the output voltage of the inverter 2 is higher in the case of the second three pulse mode of FIG. 5g ($V'_{N3}$) than in the case of the first three pulse mode of FIG. 2e ($V'_{03}$), even when the width θ remains the same.

In FIG. 7, the operation according to the present invention becomes as follows. Namely, in the first three pulse mode of FIG. 2e, the output voltage $V_M$ is increased by decreasing the width θ (cf. a broken line $V'_{03}$). When, as shown in FIG. 4c, the width θ reaches its minimum value $\theta_{min}$ (cf. point a), the first three pulse mode of FIG. 2e is changed over to the second three pulse mode of FIG. 5g (cf. point b). As understood from FIG. 7, there occurs no voltage change at that time.

Thereafter, the output voltage $V_M$ is further increased by decreasing the width $\theta$ in the second three pulse mode of FIG. 5g (cf. a solid line $V_{N3}'$). When, as shown in FIG. 6c, the width $\theta$ reaches its minimum value $\theta_{min}$ again (cf. point c), the second three pulse mode of FIG. 6c is changed over to the single pulse mode of FIG. 6f.

Let's consider the case, by way of example, of an inverter where the minimum extinction time $T_{min}$ necessary for the control switching devices UP to WN is 240 $\mu$ and the output frequency f of the inverter is 75 Hz when changing over to the single pulse mode. Then, the minimum necessary extinction period $\theta_{min}$ corresponding to $T_{min}$ (=240μs) is given as follows:

$$\theta_{min} = 360 \cdot f \cdot T_{min} = 360 \times 75 \times 240 \times 10^{-6} = 6.5°$$

Accordingly, it can be understood from FIG. 7 that, when the width $\theta$ reaches its minimal value $\theta_{min}$, whereas only 88.7% of the voltage at the final single pulse mode can be obtained in the case of the first three pulse mode of FIG. 4c, the voltage can be increased to 98.7% of the voltage of the final single pulse mode in the case of the second three pulse mode of FIG. 6c. Therefore, the quantity of change in the output voltage $V_M$ at the time of the changeover to the single pulse mode is extremely small in the latter case.

Figure 8:
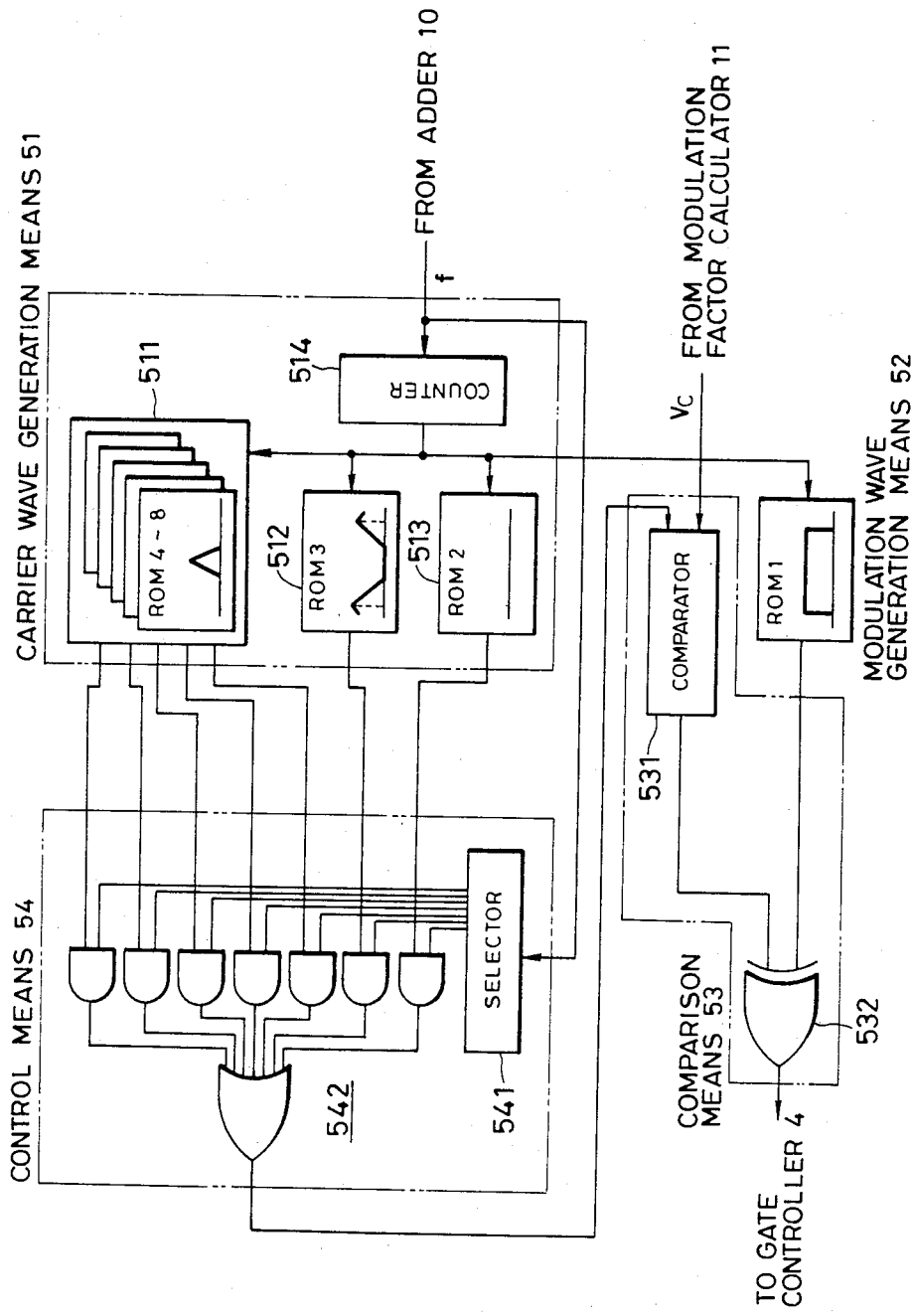
FIG. 8 is a block diagram showing the detailed arrangement of modulation means utilized in the control apparatus shown in FIG. 1.

FIG. 8 shows a detailed construction of the modulation circuit 5 of FIG. 1. The same reference numerals and symbols represent the same parts as in FIG. 1. Though, in FIG. 1, the modulating operation is explained by comparison between the modulating wave and the carrier wave both in the AC waveform, the embodiment shown in FIG. 8 compares the DC-like carrier wave with the DC level and divides the result of comparison into positive and negative periods by the DC-like modulating wave in order to simplify the circuit, as will be explained later with reference to FIG. 9.

Now, the arrangement and the operation of FIG. 8 will be explained with reference to FIG. 9. In FIG. 8, a counter 514 counts a frequency based on the inverter frequency f, and ROM (Read Only Memory) 4 of the first carrier wave generator 511 and ROM 1 of the modulation wave generation means 52 output a triangular carrier wave and a rectangular modulating wave as shown in FIGS. 9a and 9c, respectively. The triangular carrier wave of FIG. 9i a is compared with the DC level output $V_c$ of the modulation factor calculator 11 by a comparator 531, which outputs a pulse as shown in FIG. 9b. The output is then applied to an exclusive-OR 532 together with the rectangular modulating wave of FIG. 9c, and the exclusive-OR 532 generates the pulses such as shown in FIG. 9d, that is, the same pulses as three pulses in FIGS. 2b, 2c or 2d.

Incidentally, ROMs 5-8 of the first carrier wave generator 511 store in advance the triangular carrier waves providing the same number of pulses as the number of pulses obtained by comparing the triangular carrier waves with the sinusoidal modulating waves, such as 5, 9, 15, 27 and so on, for example, and the number of pulses is changed over by the control means 54 in accordance with the inverter output frequency f as shown in FIG. 3.

In other words, a particular pulse number signal is selected in response to the inverter output frequency f by a pulse number selector 541, in which the output frequencies of the inverter 2 at which the number of pulses is changed over are set in advance. The selected pulse number signal actuates one of gates of a pulse number changeover device 542, so that the output of the carrier wave generation means 51, that is, the number of pulses, is changed over.

When the output of the carrier wave generation means 51 is changed over from the output of the first carrier wave generator 511 (ROM4) to that of the second carrier wave generator 512 (ROM3) by the control means 54, the second carrier wave generator 512 outputs a triangular carrier wave as shown in FIG. 9e. In the case of this triangular carrier wave, the interval between the peak values is 180° in the electric angle, and that between the bottom values is 60° in the electric angle.

The carrier wave of FIG. 9e is compared with the DC voltage $V_C$ output from the modulation factor calculator 11 by the comparator 531, which outputs a pulse as shown in FIG. 9f. This output is applied to the exclusive-OR 532 together with the rectangular modulating wave as the output of ROM1 of the modulation wave generation means 52 as shown in FIG. 9g, and the exclusive-OR 532 outputs three pulses as shown in FIG. 9h, that is, the same pulses as those in FIGS. 5b, 5d and 5f.

Further, when the second carrier wave generator 512 (ROM3) is changed over to the third carrier wave generator 513 (ROM2) by the control means 54, the third carrier wave generator 513 outputs a zero level signal as shown in FIG. 9i. This zero level output is compared with the DC voltage $V_C$ output from the modulation factor calculator 11 by the comparator 531, which in turn outputs the zero level signal as shown in FIG. 9j. This output is applied to the exclusive-OR 532 together with the rectangular modulating wave as the output of ROM1 of the modulation wave generation means 52 as shown in FIG. 9k, and the exclusive-OR 532 outputs a pulse as shown in FIG. 9l, that is, the same pulse as that in FIGS. 6d and 6e.

Incidentally, in view of the signal flow within the modulation circuit 5, the relation of the carrier wave generation means 51 and the control means 54 in FIG. 8 becomes inverted, compared with that in FIG. 1. This is because FIG. 1 shows the generl concept of the modulation circuit 5 to facilitate the understanding the operation thereof. It is to be understood that both are functionally identical to each other.

The description given above represents the case where the conventional or first three pulse mode shown in FIG. 2e, which is created by the gate pulses as shown in FIG. 9d, is changed over to the single pulse mode of FIG. 6f, which is created by the gate pulses as shown in FIG. 9l, through the second three pulse mode of FIG. 5g, which is created by the gate pulses as shown in FIG. 9h.

It is of course possible to change over directly a five pulse mode to the single pulse mode through the second three pulse mode without passing through the first three pulse mode. In such a case, the first three pulse mode is only replaced by the second three pulse mode.

However, when the five pulse mode is changed over directly to the second three pulse mode, the output voltage $V_M$ of the inverter 2 is smaller, that is to say the width $\theta$ of the slit in the gate pulses shown in FIG. 5 becomes greater (cf. FIG. 7), than when the first three pulse mode is changed over to the second three pulse mode. Accordingly, the waveform of the output voltage of the inverter 2 gets deteriorated (or in other words, the ripple becomes great) and will result in the increase of commutation capacity of the inverter 2 (that is, the increase of the scale of the inverter 2). Therefore, a sufficient study will be necessary in this case.

The system such as the embodiment shown in FIGS. 1 and 8, in which the first three pulse mode is changed over to the single pulse mode through the second three pulse mode, provides the effect that it does not increase the ripple of the output current of the inverter 2 or in other words, does not increase the commutation capacity of the inverter 2.

Further, in the second three pulse mode, the output voltage $V_M$ of the inverter 2 becomes non-linear as shown by the solid line in FIG. 7 with respect to the width $\theta$ (cf. $V_{N3'}$). Accordingly, if a curved carrier wave as shown by a solid line in FIG. 10a is generated by the second carrier wave generator 512 in place of the carrier wave as shown by a dotted line in FIG. 10a, the change of the width $\theta$ with respect to the change of the voltage $V_C$ output from the modulation factor calculator 11 becomes non-linear so that the output voltage $V_M$ of the inverter 2 changes linearly.

In addition, if the triangular carrier wave whose tops are flat, as shown by a solid line in FIG. 11a, is generated by the second carrier wave generator 512 in place of the carrier wave as shown by a dotted line in the same figure, and then the width of the flat is made equal to the minimum extinction period $\theta_{min}$, the output voltage $V_M$ automatically become the single pulse mode in accordance with the relation $\theta \leq \theta_{min}$ due to the increase of the voltage $V_C$ output from the modulation factor calculator 11. Accordingly, there can be obtained the effect that the third carrier wave generator 513 can be omitted in the carrier wave generation means 51.

In the above description, the changeover of the number of pulses is directed to the case where the output frequency f of the inverter 2 increases, but if the output frequency f of the inverter 2 decreases, the reverse control is made for the changeover of the number of pulses. Accordingly, the aforesaid effects of the present invention are not of course lost.

In accordance with the present invention, the quantity of change in the inverter output voltage is extremely reduced during changeover between the three pulse mode and the single pulse mode, and any phase deviation does not occur, either, in the fundamental frequency component of the inverter output voltage.

To sum up, the present invention provides the following effects. Namely, at first, the jump of the inverter output voltage upon changeover between the three pulse mode and the single pulse mode becomes extremely small. Secondly, the inverter does not cause the commutation failure (decrease of the commutation capacity). Lastly, the torque change is reduced, and induction motors can be operated smoothly.

We claim:

1. A control apparatus for a pulse width modulation inverter composed of plural control switching devices, which is supplied with a DC voltage and outputs an AC voltage in proportion to the output frequency thereof, comprising
    modulation means modulating a carrier wave by a modulating wave, the frequency of which determines the frequency of the fundamental component of the output AC voltage, to generate gate signals for the control switching devices, whereby the number of pulses of a line voltage for every half cycle of the output AC voltage is changed over in accordance with the frequency of the output AC voltage and the intervals $\theta$ between the line voltage pulses are varied in every mode of the respective numbers of the pulses of the output AC voltage,
    wherein the maximal output AC voltage is obtained by changeover to a single pulse mode of the output AC voltage, in which the width of the line voltage pulse of the output AC voltage is equal to 120° in the electric angle of the output AC voltage, from a first three pulse mode, in which three pulses of the output AC voltage exist within the period of 120° in the electric angle of the output AC voltage,
    characterized in that
    the changeover between the first three pulse mode and the single pulse mode of the output AC voltage is conducted through a second three pulse mode, two pulses of which are positioned on both sides outside the period of 120° in the electric angle of the output AC voltage.

2. A control apparatus for a pulse width modulation inverter as defined in claim 1, wherein the second three pulse mode is composed of a first pulse of the width $\theta$, a second pulse having the width $(120° - 2\theta)$ after $\theta$ from the first pulse, and a third pulse of the width $\theta$ after $\theta$ from the second pulse.

3. A control apparatus for a pulse width modulation inverter as defined in claim 1, wherein, when the frequency of the output AC voltage increases, the first three pulse mode of the output AC voltage is changed over to the single pulse mode through the second three pulse mode, and when the frequency of the output AC voltage decreases, the single pulse mode is changed over to the first three pulse mode through the second three pulse mode.

4. A control apparatus for a pulse width modulation inverter as defined in claim 3, wherein the changeovers from the first three pulse mode to the second three pulse mode and from the second three pulse mode to the single pulse mode are conducted, when the intervals $\theta$ of the line voltage pulses of the output AC voltage in the first three pulse mode and in the second three pulse mode become almost equal to the minimal value determined by the minimal extinction period of the control switching devices, respectively.

5. A control apparatus for a pulse width modulation inverter as defined in claim 3, wherein the changeover from the second three pulse mode to the first three pulse mode is conducted, when the output AC voltage in the second three pulse mode is reduced down to the value substantially equal to the output AC voltage which is produced in the first three pulse mode when the intervals $\theta$ of the line voltage pulses become equal to the minimal value determined by the minimal extinction period of the control switching devices.

6. A control apparatus for a pulse width modulation inverter as defined in claim 1, wherein the gate signals for the control switching devices during the first three pulse mode are formed by modulating the carrier wave, which has the alternating triangular waveform, by the modulating wave, which has the sinusoidal waveform an the magnitude depending on the output AC voltage required for the inverter, and
    wherein the gate signals for the control switching devices during the second three pulse mode are formed by modulating a modified carrier wave by a second modulating wave,
    in which the modified carrier wave is composed of two triangular waves for every half cycle of and in synchronism with the second modulating wave, each of which has the peak value at the zero cross point of the second modulating wave, the peak values of the triangular waves in a certain half cycle being of either the positive or the negative polarity and the peak values of the triangular waves in the half cycle succeeding the certain half cycle being of the opposite polarity, and the second modulating wave is made up of a rectangular wave which alters positively or negatively and has the magnitude depending on the output AC voltage required for the inverter.

7. A control apparatus for a pulse width modulation inverter as defined in claim 1, wherein there are provided a rectangular modulating wave which has a constant magnitude during one of half cycles thereof and is maintained at zero during the other half cycle, a first triangular carrier wave, which has the peak values at the centers of every half cycle of the rectangular modulating wave, a second triangular carrier wave, which has the peak values for every half cycle of the rectangular modulating wave, and a third carrier wave, which is always maintained at the zero level, the gate signals for the control switching devices during the first three pulse mode and during the second three pulse mode are formed in the manner that the first and the second triangular carrier waves are compared with a DC voltage depending on the output AC voltage required for the inverter, and the comparison outputs are exclusive-ORed with the modulating wave, respectively, and the gate signals for the control switching devices for the single pulse mode are formed in the manner that the third carrier wave is compared with the DC voltage and the comparison output is exclusive-ORed with the modulating wave.

8. A control apparatus for a pulse width modulation inverter as defined in claim 7, wherein the second triangular carrier wave is such that the magnitude increases non-linearly from zero to the peak value and decreases non-linearly from the peak value to zero.

9. A control apparatus for a pulse width modulation inverter as defined in claim 7, wherein the second triangular carrier wave has the flat portion at the top of the triangular waveform.

10. A control apparatus for a pulse width modulation inverter as defined in claim 9, wherein the width of the flat portion is determined on the basis of the minimal extinction period of the control switching devices.

11. A control apparatus for a pulse width modulation inverter as defined in claim 7, wherein the modulation means comprising carrier wave generation means including a first carrier wave generator consisting of read only memories (ROMs) for storing data for the first triangular carrier waves of various frequencies, a second carrier wave generator consisting of ROM for storing data for the second triangular carrier wave and a third carrier wave generator consisting of ROM for storing zero;

modulation wave generation means consisting of ROM for storing data for the rectangular modulating wave;

control means for selecting one of outputs from the carrier wave generation means in accordance with the frequency of the output AC voltage;

comparison means for comparing the selected output from the control means with the DC voltage depending on the output AC voltage required for the inverter and producing an output by the exclusive-OR of the comparison output and the output from the modulation wave generation means, the output of the comparison means being utilized for gate signals for the control switching devices.

* * * * *